(12) United States Patent
Cavallo

(10) Patent No.: US 7,441,146 B2
(45) Date of Patent: Oct. 21, 2008

(54) RAID WRITE COMPLETION APPARATUS, SYSTEMS, AND METHODS

(75) Inventor: Joseph S. Cavallo, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 609 days.

(21) Appl. No.: 11/150,832

(22) Filed: Jun. 10, 2005

(65) Prior Publication Data

US 2006/0282700 A1    Dec. 14, 2006

(51) Int. Cl.
G06F 11/00        (2006.01)
(52) U.S. Cl. .......................................................... 714/6
(58) Field of Classification Search ...................... 714/6, 714/7, 9, 15, 42, 43, 54
See application file for complete search history.

(56) References Cited

U.S. PATENT DOCUMENTS

| | | | |
|---|---|---|---|
| 5,452,444 A | | 9/1995 | Solomon et al. |
| 5,574,882 A | * | 11/1996 | Menon et al. ................ 711/114 |
| 5,778,426 A | | 7/1998 | DeKoning et al. |
| 5,911,779 A | | 6/1999 | Stallmo et al. |
| 6,032,263 A | * | 2/2000 | Yamamoto et al. .............. 714/6 |
| 6,041,423 A | | 3/2000 | Tsukerman |
| 6,073,218 A | | 6/2000 | DeKoning et al. |
| 6,101,615 A | * | 8/2000 | Lyons ............................ 714/6 |
| 6,334,168 B1 | | 12/2001 | Islam et al. |
| 6,473,867 B2 | * | 10/2002 | Yamamoto et al. .............. 714/6 |
| 6,675,318 B1 | * | 1/2004 | Lee ................................ 714/6 |
| 6,795,895 B2 | | 9/2004 | Merkey et al. |
| 6,807,642 B2 | * | 10/2004 | Yamamoto et al. .............. 714/6 |
| 7,185,128 B1 | * | 2/2007 | Kotlowski et al. ............ 710/104 |
| 7,197,599 B2 | | 3/2007 | Corrado et al. |
| 2001/0002480 A1 | | 5/2001 | DeKoning et al. |
| 2003/0061441 A1 | * | 3/2003 | Yamamoto et al. ........... 711/114 |
| 2005/0144381 A1 | | 6/2005 | Corrado |
| 2006/0236029 A1 | | 10/2006 | Corrado et al. |
| 2006/0288161 A1 | | 12/2006 | Cavallo |
| 2007/0028044 A1 | | 2/2007 | Hetrick et al. |

FOREIGN PATENT DOCUMENTS

WO    WO-2006/113823 A2    10/2006

OTHER PUBLICATIONS

"Intel® 80303 I/O Processor", *Datasheet*, (Jun. 2002), 56 pgs.
"PCI Local Bus Specification", *Revision 2.3*, PCI Special Interest Group, Portland, OR, (Mar. 29, 2002), 328 pgs.

(Continued)

*Primary Examiner*—Nadeem Iqbal
(74) *Attorney, Agent, or Firm*—Christopher K. Gagne

(57) ABSTRACT

Apparatus and systems, as well as methods and articles, may operate to respond to a write request from a disk I/O process with write completion status from a RAID sub-system after writing update data associated with the write request to a data strip in a stripe associated with the RAID sub-system and before writing a parity strip update value to a parity strip in the stripe, a Q strip update value to a Q strip in the stripe, or both.

29 Claims, 3 Drawing Sheets

OTHER PUBLICATIONS

Deyring, K.-P., "Serial ATA: High Speed Serialized AT Attachment", *Revision 1.0*, (Aug. 29, 2001), 307 pgs.

Elliott, R. C., "Information Technology—Serial Attached SCSI (SAS)", *Working Draft, American National Standard—Project T10/1562-D (Revision 5)*, (Jul. 9, 2003), 464 pgs.

Nelson, J., "Fibre Channel—Framing and Signaling (FC-FS)", *FC-FS Draft Standard, Rev. 1.90*, (Apr. 9, 2003), 64 pgs.

Patterson, D. A., et al., "A Case for Redundant Arrays of Inexpensive Disks (RAID)", *ACM SIGMOD International Conference on Management of Data*, (Jun. 1998), 109-116.

Non-Final Office Action for U.S. Appl. No. 11/155,295 mailed on Dec. 12, 2007, 14 pgs.

Response to Non-Final Office Action for U.S. Appl. No. 11/155,295, filed Mar. 4, 2008, 8 pgs.

\* cited by examiner

RAID WRITE COMPLETION APPARATUS, SYSTEMS, AND METHODS

TECHNICAL FIELD

Various embodiments described herein relate to mass storage technology generally, including apparatus, systems, and methods used to write to a redundant disk array.

BACKGROUND INFORMATION

A write operation associated with a redundant array of inexpensive disks, level five (RAID-5) may include reading old parity, reading old data, and subtracting out the old data from the old parity to derive an intermediate result. The operation may also include adding in new data to the intermediate result to derive a new parity value, and writing both the new parity and the new data to disk. The write operation may thus include two reads, two parity calculations, and two writes to complete a host write request. RAID-6 writes may be performed in a similar manner, to further include updating a second error correction redundancy quantity analogous to parity, sometimes called "Q." Q may coexist with parity and may add an additional read, an additional write, and two Q calculations. Other RAID levels may utilize second error correction redundancy strips analogous to Q, and may be referred to using other names including "second parity."

In the cases of both RAID-5 and RAID-6, a host RAID controller may not respond to a write request until the previously-described operations are complete. As a result, a RAID-5 write may take as long to complete as four read operations. A RAID-6 write may take as long to complete as six read operations.

DETAILED DESCRIPTION

Figure 1:
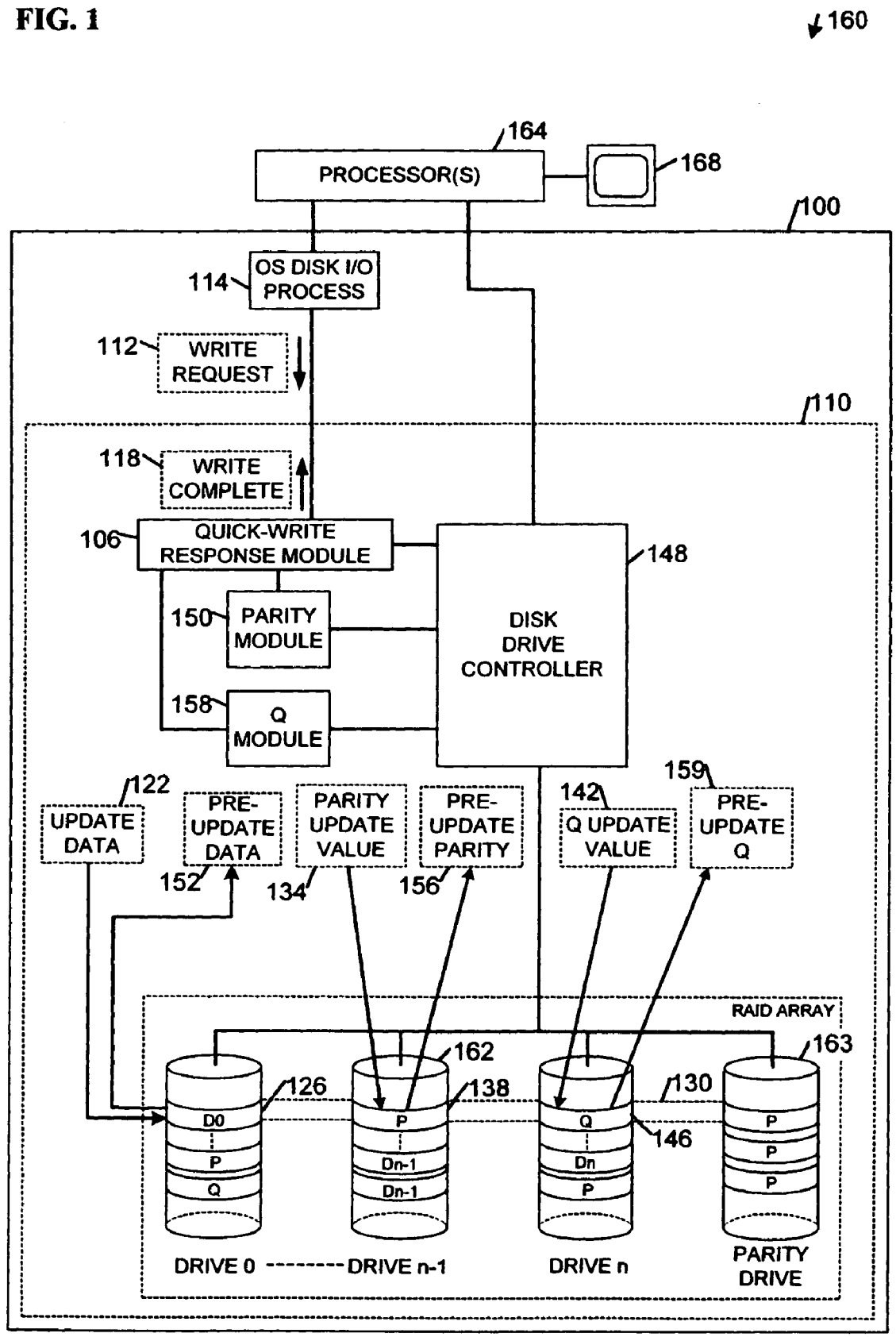
FIG. 1 is a block diagram of an apparatus and a representative system according to various embodiments of the invention.

FIG. 1 comprises a block diagram of an apparatus 100 and a system 160 according to various embodiments of the invention. Some embodiments of the invention may respond to a host write request after reading old data from disk and writing new data, as if operations associated with a data update were all completed. That is, some embodiments may read the old data, write the new data, respond to the host with a "write request complete" status, read old parity, subtract out the old data from the old parity to derive intermediate parity, add in the new data to the intermediate parity to derive new parity, and write the new parity to the disk, in the stated order.

For RAID-6, the order may include reading the old data, writing the new data, responding to the host with the write request completion, reading the old parity, reading old Q, subtracting out the old data from the old parity to derive the intermediate parity, subtracting out the old data from the old Q to derive an intermediate Q, adding back the new data to the intermediate parity to derive the new parity, adding the new data to the intermediate Q to derive a new Q, writing the new parity, and writing the new Q. The parity read, re-calculate, and write-back sequence may proceed independently from the Q read, re-calculate, and write-back sequence.

It should be noted that the write request completion response to the host may have moved up in the order significantly as compared to traditional write methods. While the same overhead may be incurred, the response may be sooner. Write throughput may thus remain the same as with the traditional methods, but response time may be decreased to one-half in the case of RAID-5, and it may be divided by three compared to traditional RAID-6 operations.

Once a host write request is responded to, its data must be under full RAID protection. The write overhead may be divided into a "visible" portion done before responding to the host and a "hidden" portion done after responding to the host. Embodiments disclosed herein may maintain the write data in memory until after both portions are accomplished. Thus, no matter how many disks fail, the data could be retrieved from memory so the data is fully RAID protected. The old data is kept in memory until after both portions of the work are accomplished. So, the old data can be used for parity calculation of parallel strips, and the entire stripe is safe using the disclosed embodiments just as with the classical RAID write methods discussed above.

In the classical method, simultaneous power and disk failures occurring while writes are in progress are considered a double (unrecoverable) failure, because the parity strip may or may not be current relative to the data strip during this period. In some embodiments of the invention, the disclosed method may be limited to situations wherein the visible portion of some writes is in progress. Implementing this restriction may avoid introducing additional risk to a RAID subsystem, since the volume would be lost anyway if a write is literally in progress during simultaneous power and disk failures.

In some embodiments, the apparatus 100 may include a quick-write response module 106 associated with a RAID sub-system 110 to respond to a write request 112 from a disk input-output (I/O) process 114. The RAID sub-system 110 may comprise one or more of RAID-3, RAID-4, RAID-5, and RAID-6. References to a Q strip 146 or values associated with the Q strip 146 may be applicable to RAID-6 and to other double-redundancy error-corrected RAID systems.

The response module 106 may respond with write completion status 118 after update data 122 associated with the write request is written to a data strip 126 in a stripe 130 associated with the RAID sub-system 110. The RAID sub-system 110 may subsequently write a parity strip update value 134 to a parity strip 138 in the stripe 130, a Q strip update value 142 to a Q strip 146 in the stripe 130, or both. The apparatus 100 may include a disk drive controller module 148 to read from and write to the data strip 126, the parity strip 138, and the Q strip 146.

The apparatus 100 may also include a parity module 150 coupled to the quick-write response module 106 to generate the parity strip update value 134 from a pre-update data value 152, a pre-update parity strip value 156, and the update data 122. In the case of RAID-6, the apparatus 100 may further include a Q module 158 coupled to the quick-write response module 106 to generate the Q strip update value 142 from the pre-update data value 152, a pre-update Q strip value 159, and the update data 122.

In another embodiment, a system 160 may comprise one or more of the apparatus 100, including a quick-write response module 106 to respond to a write request 112. The response may occur after update data 122 associated with the write request 112 is written to a data strip 126 in a stripe 130 associated with a RAID sub-system 110. The response may also occur before writing updates to one or more of a parity strip 138 and a Q strip 146 associated with the stripe 130. The parity strip 138 may be located on a data disk drive 162 (e.g., distributed parity used in RAID-5 and RAID-6) or on a parity disk drive 163 (e.g., centralized parity used in RAID-3 and RAID-4). The system 160 may include a disk drive controller module 148 to read from and write to the data strip 126, the parity strip 138, and the Q strip 146.

The system 160 may also include one or more processor(s) 164 coupled to the response module 106 to provide the update data 122 to write to the data strip 126, and a display 168 coupled to the processor(s) 164 to display the update data 122. The display 168 may comprise a cathode ray tube display or a solid-state display such as a liquid crystal display, a plasma display, or a light-emitting diode display, among others.

Any of the components previously described can be implemented in a number of ways, including embodiments in software. Thus, the apparatus 100; quick-write response module 106; RAID sub-system 110; write request 112; disk I/O process 114; write completion status 118; update data 122; data strip 126; stripe 130; update values 134, 142; parity strip 138; Q strip 146; disk drive controller module 148; parity module 150; pre-update values 152, 156, 159; Q module 158; data disk drive 162; parity disk drive 163; processor(s) 164; and display 168 may all be characterized as "modules" herein.

The modules may include hardware circuitry, single or multi-processor circuits, memory circuits, software program modules and objects, firmware, and combinations thereof, as desired by the architect of the apparatus 100 and system 160 and as appropriate for particular implementations of various embodiments. Thus, the modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. These simulations may be used to characterize or test the embodiments, for example.

It should also be understood that the apparatus and systems of various embodiments can be used in applications other than responding to a disk I/O process write request with write completion status from a RAID sub-system before updating parity strip(s) associated with the write operation. Thus, various embodiments of the invention are not to be so limited. The illustrations of apparatus 100 and system 160 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
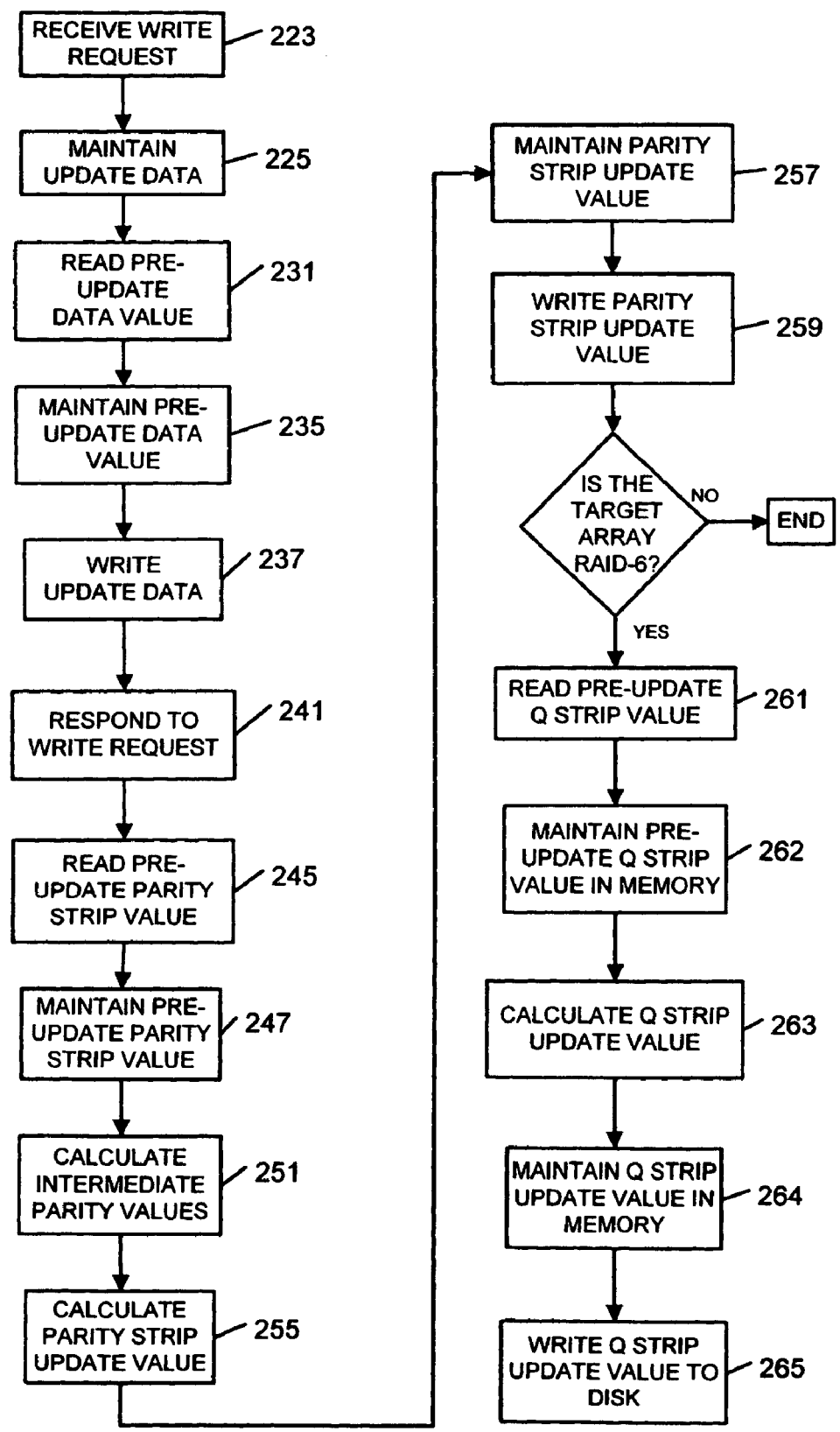
FIG. 2 is a flow diagram illustrating several methods according to various embodiments of the invention.

FIG. 2 is a flow diagram illustrating several methods 211 according to various embodiments of the invention. One such method 211 may begin at block 223 with receiving a write request from a disk I/O process at a RAID sub-system. The RAID sub-system may comprise one or more of RAID-3, RAID-4, RAID-5, and RAID-6. Portions of the method 211 referencing a Q strip or values associated with the Q strip may be applicable to RAID-6 only. The RAID sub-system may consequently target write operations to a data strip in a selected stripe within a RAID array associated with the RAID sub-system. A parity strip, a Q strip, or both may also be associated with the stripe. The method 211 may include maintaining the update data in memory until after writing one or more of the update data to the data strip, a parity strip update value to the parity strip, and perhaps a Q strip update value to the Q strip, at block 225.

The method 211 may continue at block 231 with reading a pre-update data value from the data strip after receiving the write request and before writing update data to the data strip responsive to the write request. The method 211 may include maintaining the pre-update data value in memory until after writing one or more of the update data to the data strip, the parity strip update value to the parity strip, and perhaps the Q strip update value to the Q strip, at block 235. The method 211 may also include writing the update data after reading the pre-update data value and before responding with write completion status, at block 237. Although initiation of the method 211 may be limited to cases wherein the RAID sub-system is operating in a non-degraded RAID mode, a disk may fail at some point after the initiation of the method 211. In the latter case the update data may comprise a RAID degraded write-mode operation to adjust contents of the parity strip, the Q strip, or both.

The method 211 may continue at block 241 with responding to the write request with the write completion status from the RAID sub-system after writing the update data and before writing the parity strip update value to the parity strip in the stripe, the Q strip update value to a Q strip in the stripe, or both.

The method 211 may also include reading a pre-update parity strip value associated with the pre-update data value and with one or more data values from one or more additional data strips in the stripe (e.g., data strips from disk drives in addition to the disk drive containing the data strip to be updated), at block 245. Some versions of the method 211 may limit reading the pre-update parity strip value to periods after responding with the write completion status. The method 211 may include maintaining the pre-update parity strip value in memory until after writing the update data to the data strip, the parity strip update value to the parity strip, or both, at block 247.

The method 211 may further include performing an exclusive OR operation on the pre-update data value and on the pre-update parity strip value to calculate an intermediate parity value, at block 251. The method 211 may continue with performing an exclusive OR operation on the update data and on the intermediate parity value to calculate the parity strip update value, at block 255. The method 211 may include maintaining the parity strip update value in memory until after writing the update data to the data strip, the parity strip update value to the parity strip, or both, at block 257. The method 211 may also include writing the parity strip update value to the parity strip after responding with the write completion status, at block 259.

In the case of RAID-6, the method 211 may continue at block 261 with reading a pre-update Q strip value associated with the pre-update data value and with the one or more data values from the one or more additional data strips in the stripe. As with the pre-update parity strip value, some versions of the method 211 may limit reading the pre-update Q strip value to periods after writing the update data to the data strip. The method 211 may also include maintaining the pre-update Q strip value in memory until after writing one or more of the update data to the data strip, the parity strip update value to the parity strip, and the Q strip update value to the Q strip, at block 262.

The method 211 may also include calculating the Q strip update value using the pre-update Q strip value from a RAID-6 array, the pre-update data value, and the update data, at block 263. The method 211 may further include maintaining the Q strip update value in memory until after writing one or more of the update data to the data strip, the parity strip update value to the parity strip, and the Q strip update value to the Q strip, at block 264. The method 211 may conclude at block 265 with writing the Q strip update value to the Q strip after responding with the write completion status.

It may be possible to execute these methods in an order other than that described. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
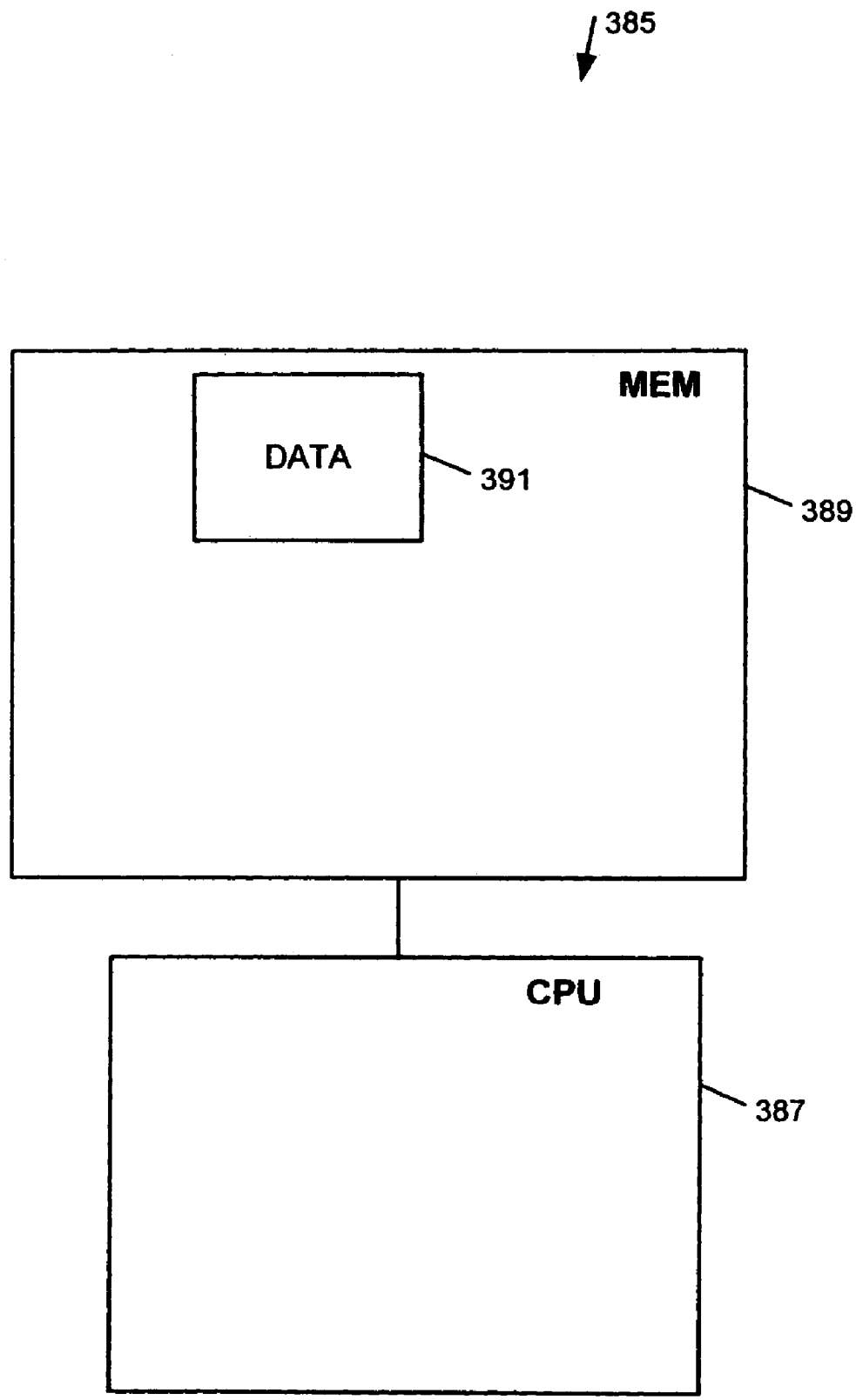
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) responding to a write request from a disk I/O process with write completion status from a RAID sub-system. The RAID sub-system may comprise one or more of RAID-3, RAID-4, RAID-5, and RAID-6. Activities referencing a Q strip or values associated with the Q strip may be applicable to RAID-6 only. The write completion status may be issued after writing update data associated with the write request to a data strip in a stripe associated with the RAID sub-system. The status may be issued before writing a parity strip update value to a parity strip in the stripe, a Q strip update value to a Q strip in the stripe, or both.

Other activities may include reading a pre-update data value from the data strip after receiving the write request and before writing the update data to the data strip. Further activities may include reading a pre-update parity strip value and a pre-update Q strip value associated with the pre-update data value and with a data value associated with one or more additional data strips in the stripe (e.g., reading all strips in the stripe necessary to re-calculate parity and Q). Reading these values may occur after responding with the write completion status.

Further activities may include maintaining the pre-update data value, the pre-update parity strip value, or both in memory until after writing the update data to the data strip, the parity strip update value to the parity strip, or both. Additional activities may include maintaining the update data, the parity strip update value, or both in memory until after writing the update data, the parity strip update value, or both. Other activities may include maintaining the pre-update Q strip value in memory until after writing one or more of the update data to the data strip, the parity strip update value to the parity strip, and the Q strip update value to the Q strip. Further activities may include maintaining the Q strip update value in memory until after writing one or more of the update data to the data strip, the parity strip update value to the parity strip, and the Q strip update value to the Q strip.

Implementing the apparatus, systems, and methods disclosed herein may operate to respond to a disk I/O process write request with write completion status from a RAID sub-system before updating parity strip(s) associated with the write operation. Doing so may operate to decrease a response time associated with disk I/O operations.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single embodiment or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method including the following operations comprising:
responding to a write request from a disk input-output (I/O) process with write completion status from a redundant array of inexpensive disks (RAID) sub-system, the responding occurring after writing update data associated with the write request to a data strip in a stripe associated with the RAID sub-system and before writing at least one of a parity strip update value to a parity strip in the stripe and a Q strip update value to a Q strip in the stripe; and
reading a pre-update parity strip value associated with a pre-update data value in the data strip and with a data value associated with at least one additional data strip in the stripe.

2. The method of claim 1, the operations further including:
receiving the write request from the disk I/O process.

3. The method of claim 2, the operations further including:
reading the pre-update data value from the data strip after receiving the write request and before writing the update data to the data strip.

4. The method of claim 3, the operations further including:
writing the update data to the data strip after reading the pre-update data value from the data strip and before responding with the write completion status.

5. The method of claim 4, wherein the writing the update data comprises a RAID degraded write-mode operation to adjust at least one of contents of the parity strip and contents of the Q strip if a target disk containing the data strip fails after responding with the write completion status.

6. The method of claim 4, wherein:
the reading of the pre-update parity strip value occurs after responding with the write completion status.

7. The method of claim 6, the operations further including:
performing an exclusive OR operation on the pre-update data value and on the pre-update parity strip value to calculate an intermediate parity value; and performing an exclusive OR operation on the update data and on the intermediate parity value to calculate a parity strip update value.

8. The method of claim 7, the operations further including:
writing the parity strip update value to the parity strip after responding with the write completion status.

9. The method of claim 8, wherein the RAID sub-system comprises at least one of a RAID-3 sub-system, a RAID-4 sub-system, and a RAID-5 sub-system.

10. The method of claim 8, wherein the RAID sub-system comprises a RAID-6 sub-system.

11. The method of claim 10, the operations further including:
reading a pre-update Q strip value associated with the pre-update data value and with a data value associated with at least one additional data strip in the stripe, the reading occurring after responding with the write completion status.

12. The method of claim 11, the operations further including:
calculating a Q strip update value using the pre-update Q strip value, the pre-update data value and the update data; and writing the Q strip update value to the Q strip after responding with the write completion status.

13. An article including a machine-accessible storage medium having associated information, wherein the information, when accessed, results in a machine performing operations comprising:
responding to a write request from a disk input-output (I/O) process with write completion status from a redundant array of inexpensive disks (RAID) sub-system after writing update data associated with the write request to a data strip in a stripe associated with the RAID sub-system and before writing at least one of a parity strip update value to a parity strip in the stripe and writing a Q strip update value to a Q strip in the stripe; and
reading at least one of a pre-update parity strip value and a pre-update Q strip value associated with a pre-update data value in the data strip and with a data value associated with at least one additional data strip in the stripe.

14. The article of claim 13, wherein the operations comprise:
reading the pre-update data value from the data strip after receiving the write request and before writing the update data to the data strip.

15. The article of claim 14, wherein:
the reading occurs after writing the update data to the data strip.

16. The article of claim 15, wherein the operations further comprise:
maintaining the pre-update data value and the pre-update parity strip value in memory until after writing the update data to the data strip and writing the parity strip update value to the parity strip.

17. The article of claim 16, wherein the operations further comprise:
maintaining the update data and the parity strip update value in memory until after writing the update data to the data strip and writing the parity strip update value to the parity strip.

18. The article of claim 17, wherein the RAID sub-system comprises at least one of a RAID-3 sub-system, a RAID-4 sub-system, and a RAID-5 sub-system.

19. The article of claim 17, wherein the RAID sub-system comprises a RAID-6 sub-system.

20. The article of claim 19, wherein the operations further comprise:
maintaining the pre-update Q strip value in memory until after writing the update data to the data strip, the parity strip update value to the parity strip, and the Q strip update value to the Q strip.

21. The article of claim 16, wherein the operations further comprise:
maintaining the Q strip update value in memory until after writing the update data to the data strip, the parity strip update value to the parity strip, and the Q strip update value to the Q strip.

22. An apparatus comprising:
a quick-write response module to respond to a write request from a disk input-output (I/O) process with write completion status from a redundant array of inexpensive disks (RAID) sub-system after writing update data associated with the write request to a data strip in a stripe associated with the RAID sub-system and before writing at least one of a parity strip update value to a parity strip in the stripe and a Q strip update value to a Q strip in the stripe; and
a Q module coupled to the quick-write response module to generate the Q strip update value from a pre-update data value, a pre-update Q strip value, and the update data.

23. The apparatus of claim 22, further including:
a parity module coupled to the quick-write response module to generate the parity strip update value from the pre-update data value, a pre-update parity strip value, and the update data.

24. The apparatus of claim 23, wherein the RAID sub-system comprises at least one of a RAID-3 sub-system, a RAID-4 sub-system, and a RAID-5 sub-system.

25. The apparatus of claim 23, wherein the RAID sub-system comprises a RAID-6 sub-system.

26. The apparatus of claim 22, further comprising:
a disk drive controller module to read from and write to at least one of the data strip, the parity strip, and the Q strip.

27. A system comprising:
a quick-write response module to respond to a write request from a disk input-output (I/O) process with write completion status from a redundant array of inexpensive disks (RAID) sub-system after writing update data associated with the write request to a data strip in a stripe associated with the RAID sub-system and before writing at least one of a parity strip update value to a parity strip in the stripe and a Q strip update value to a Q strip in the stripe;
a processor coupled to the response module to provide the update data to write to the data strip;
a Q module coupled to the quick-write response module to generate the Q strip update value from a pre-update data value, a pre-update Q strip value, and the update data; and
a display coupled to the processor to display the update data.

28. The system of claim 27, further comprising:
a disk drive controller module to read from and write to at least one of the data strip, the parity strip, and the Q strip.

29. The system of claim 27, wherein the parity strip is located on at least one of a data disk drive and a parity disk drive.

* * * * *